United States Patent [19]

Ohishi et al.

[11] Patent Number: 5,757,569

[45] Date of Patent: May 26, 1998

[54] HELICAL SCAN TYPE INFORMATION RECORDING DEVICE FOR DIGITAL AND ANALOG SIGNALS

[75] Inventors: Takeo Ohishi, Yokohama; Seiji Higurashi, Fuchu, both of Japan

[73] Assignee: Victor Company of Japan, Ltd., Japan

[21] Appl. No.: 543,907

[22] Filed: Oct. 17, 1995

[30] Foreign Application Priority Data

Dec. 28, 1994 [JP] Japan .................... 6-339729

[51] Int. Cl.⁶ .................... G11B 15/14; G11B 5/03
[52] U.S. Cl. .................... 360/64; 360/66
[58] Field of Search .................... 360/64, 66

[56] References Cited

U.S. PATENT DOCUMENTS 4,905,103  2/1990  Ohira .................... 360/64
5,057,944  10/1991  Ozaki et al. .................... 360/64 X
5,506,733  4/1996  Kim et al. .................... 360/64

*Primary Examiner*—Aristotelis M. Psitos
*Assistant Examiner*—Regina Y. Neal
*Attorney, Agent, or Firm*—Ladas & Parry

[57] ABSTRACT

A device for recording an information signal on a magnetic tape by using a helical scan include a rotary drum, a plurality of types of magnetic heads including at least one magnetic head of each of the types provided on the rotary drum for recording a corresponding type of the information signal, and switching units which switch the at least one magnetic head between a recording of the information signal and an erasing of the information signal. During rotation of the rotary drum, one type of the at least one magnetic head erases the information signal prerecorded on the magnetic tape before another type of the at least one magnetic head records a corresponding type of the information signal on the magnetic tape.

2 Claims, 13 Drawing Sheets

FIG. I PRIOR ART
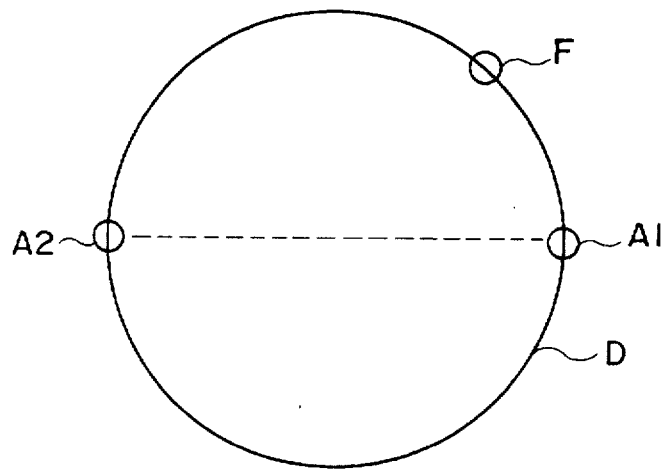
FIG. 2 PRIOR ART
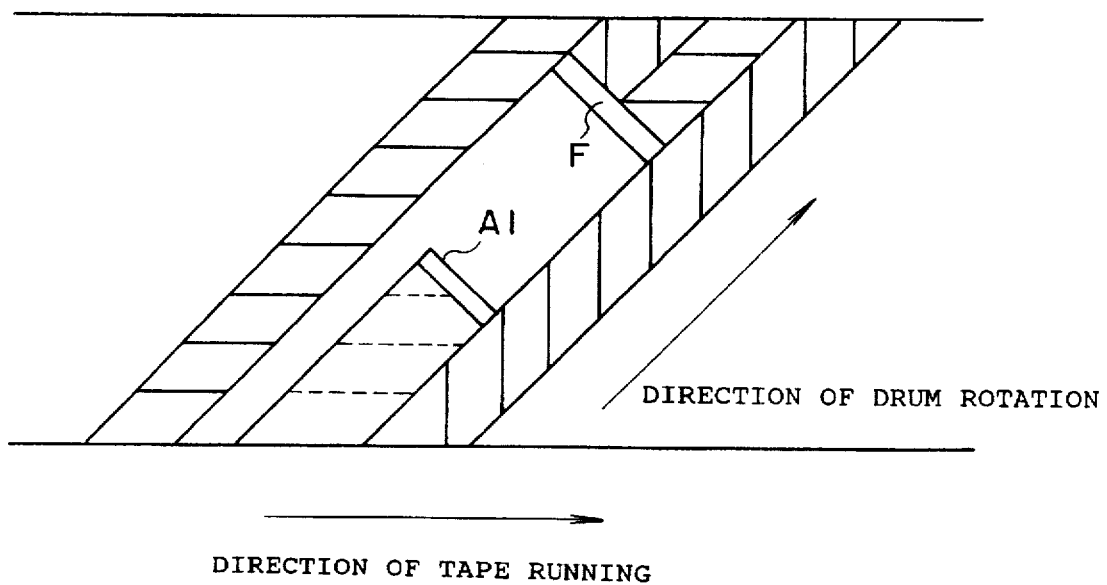

DIRECTION OF DRUM ROTATION

DIRECTION OF TAPE RUNNING $t\theta$

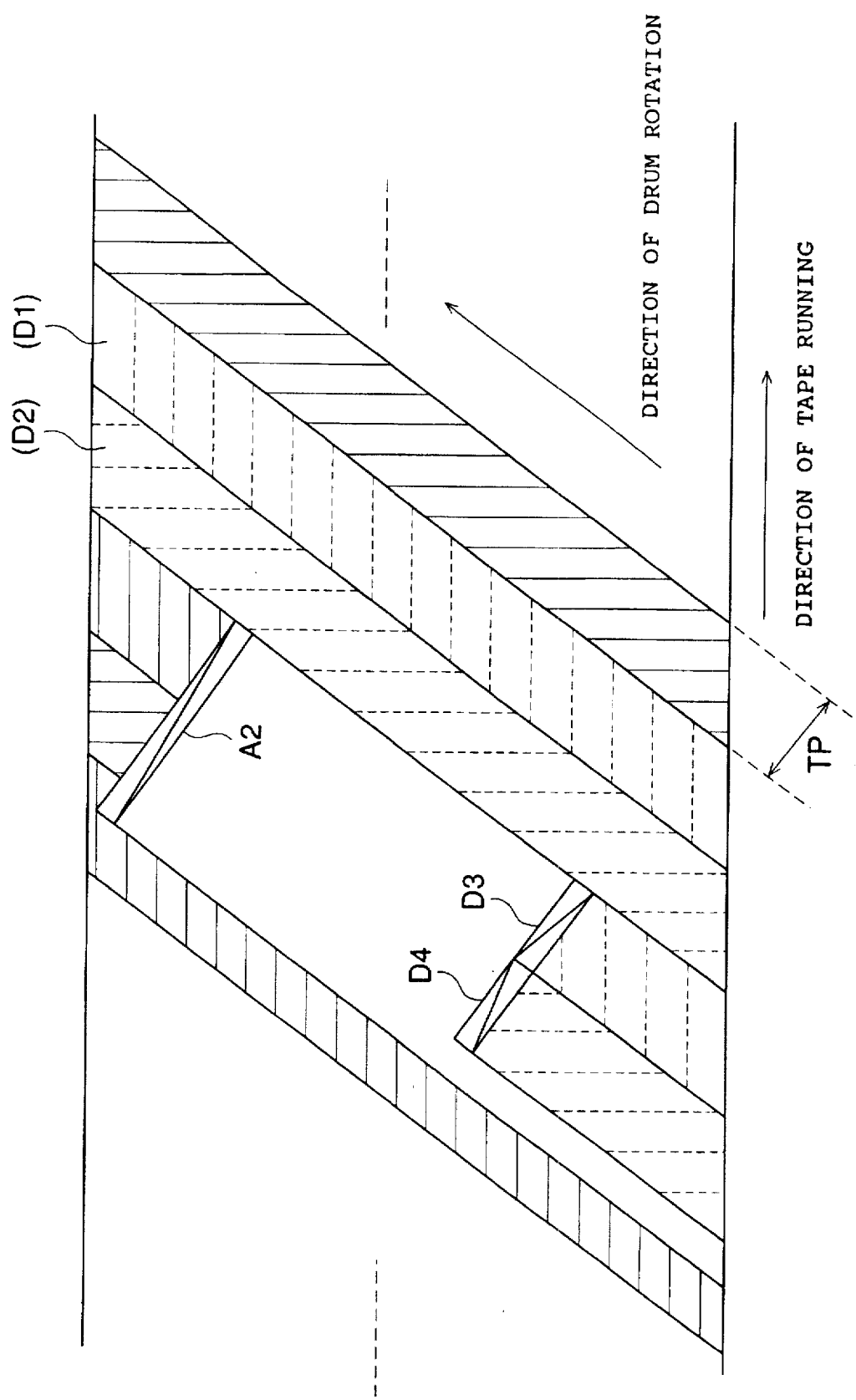

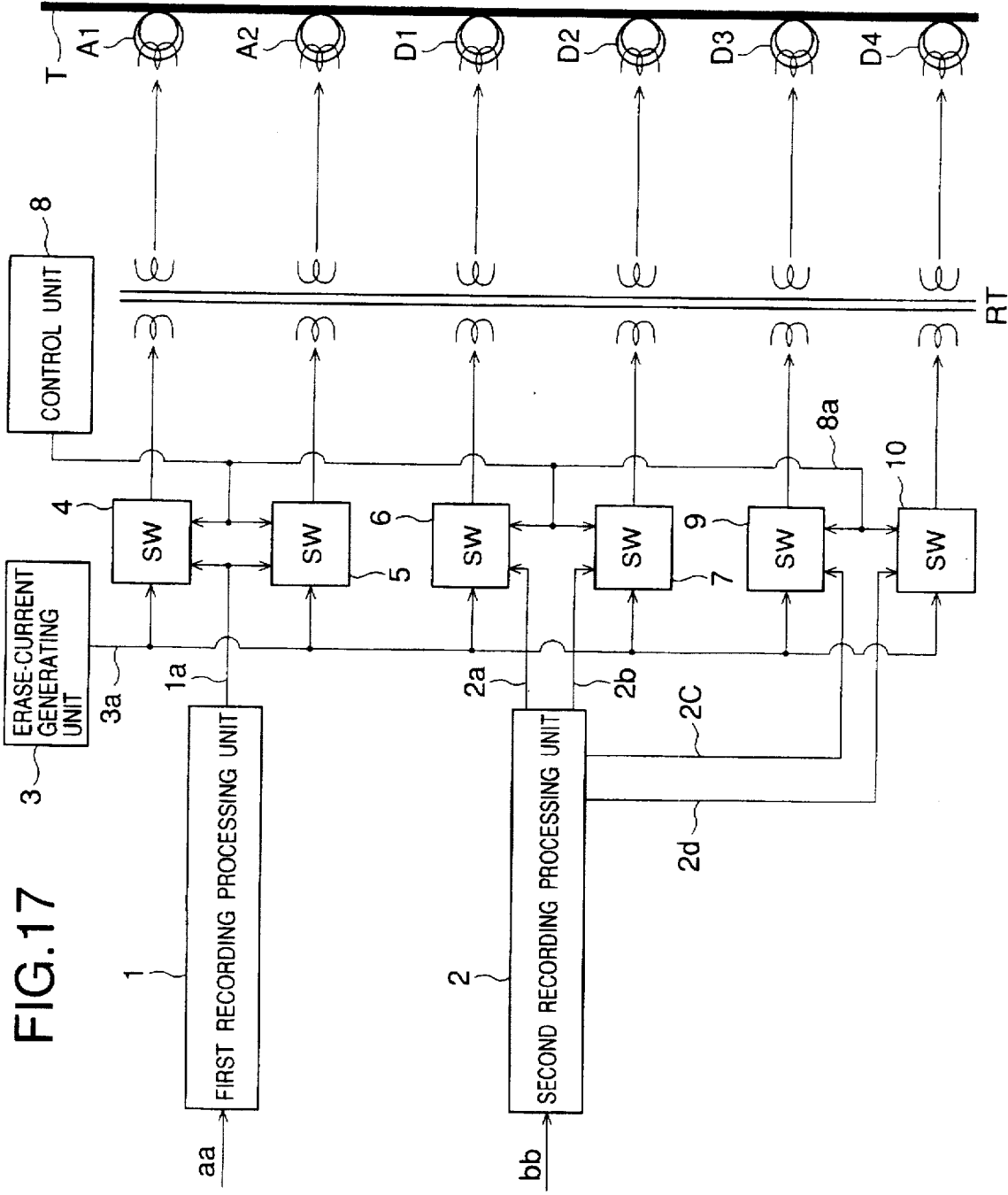

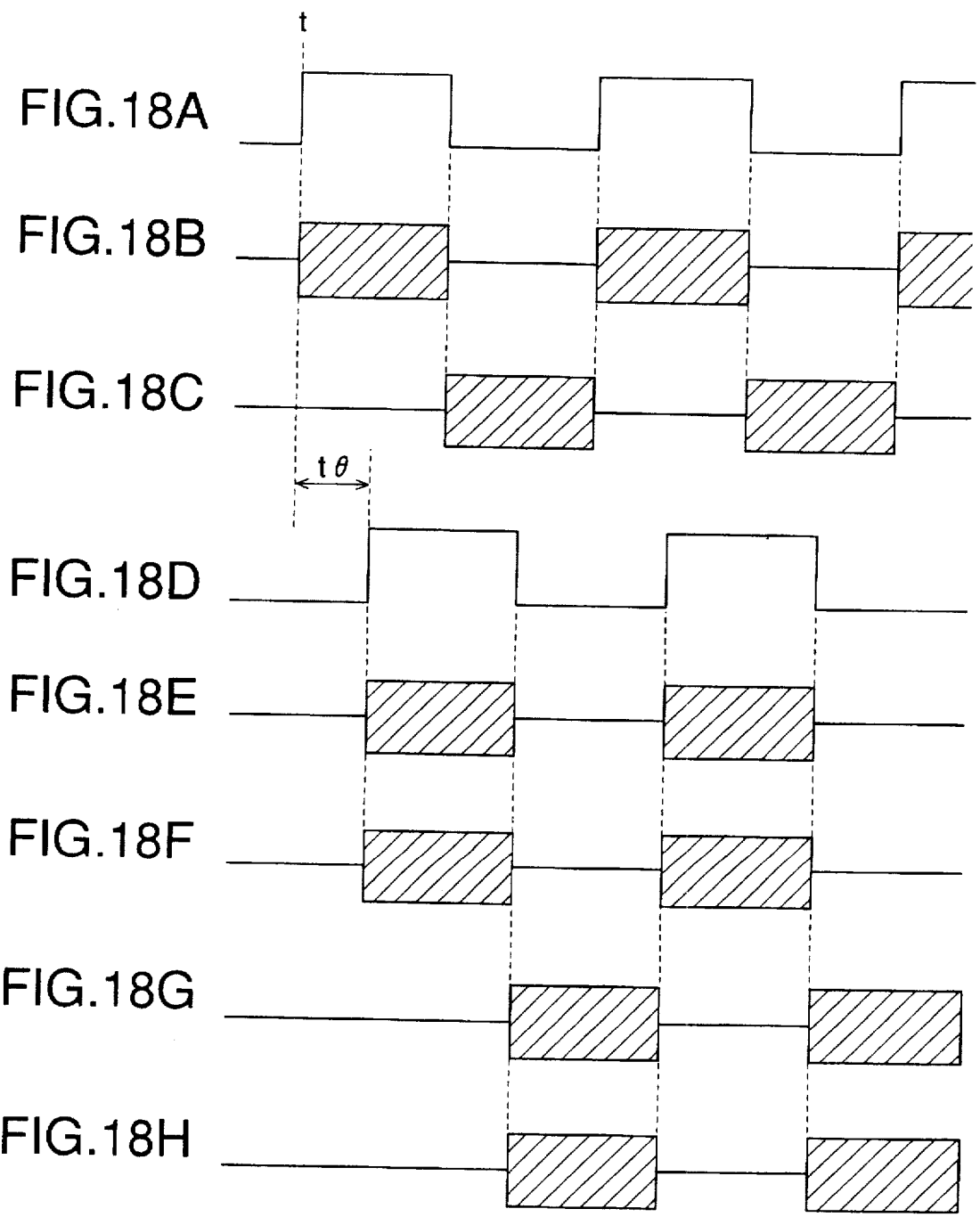

HELICAL SCAN TYPE INFORMATION RECORDING DEVICE FOR DIGITAL AND ANALOG SIGNALS

BACKGROUND OF THE INVENTION

This application claims priority from Japanese patient application No. 6-339729 filed Dec. 28, 1994. Said document is incorporated herein by reference.

1. Field of the Invention

The present invention generally relates to information recording/reproducing devices, and, more particularly, relates to an information recording/reproducing device of the helical scanning type.

2. Description of the Related Art

In magnetic recording/reproducing devices of the helical scanning type (hereinafter called VTR devices), a flying erase head is conventionally used for avoiding the generation of rainbow noise during the rerecording of an information signal.

FIG. 1 shows a plan view of a rotary drum D for explaining an arrangement of a flying-erase head F and magnetic heads A1 and A2. As shown in FIG. 1, the flying-erase head F is provided on the rotary drum D at a position such that the flying-erase head F contacts a magnetic tape prior to the magnetic heads A1 and A2. Here, the magnetic heads A1 and A2 are provided for recording an analog information signal on the magnetic tape. The flying-erase head F is used for erasing a prerecorded track before a new track is recorded.

FIG. 2 is an illustrative drawing showing erasing of prerecorded tracks and recording of a new track. As shown in FIG. 2, the flying-erase head F erases a prerecorded track or prerecorded tracks, and the magnetic head A1 records a new analog information signal to form a new track.

When a single rotary drum is used for recording different types of information signals such as an analog information signal and a digital information signal, separate magnetic heads should be provided on the rotary drum to record the different types of information signals. In such a case, providing the flying-erase head leads to lack of space on the rotary drum and to an undesirable increase in the number of transmission channels of a rotary transformer.

Accordingly, there is a need in the field of the VTR devices for a VTR device which provides a mechanism for erasing a prerecorded track despite limitations of space on the rotary drum and the number of transmission channels of the rotary transformer.

SUMMARY OF THE INVENTION

Accordingly, it is a general object of the present invention to provide a VTR device which can satisfy the need described above.

Also, it is another and more specific object of the present invention to provide a VTR device which provides a mechanism for erasing a prerecorded track despite limitations of space on the rotary drum and the number of transmission channels of the rotary transformer.

In order to achieve the above objects according to the present invention, a device for recording an information signal on a magnetic tape by using a helical scan includes a rotary drum, a plurality of types of magnetic heads including at least one magnetic head of each of said types provided on the rotary drum for recording a corresponding type of the information signal, and switching units which switch said at least one magnetic head between a recording of the information signal and an erasing of the information signal. During rotation of the rotary drum, one type of said at least one magnetic head erases the information signal prerecorded on the magnetic tape before another type of said at least one magnetic head records a corresponding type of the information signal on the magnetic tape.

In the present invention described above, one type of at least one magnetic head is used as a flying-erase head for another type of at least one magnetic head. Thus, there is no need to provide a special-purpose flying-erase head or to provide an exclusive transmission channel of the rotary transformer for the flying-erase head.

Other objects and further features of the present invention will be apparent from the following detailed description when read in conjunction with the accompanying drawings.

BRIEF DESCRIPTION OF THE DRAWINGS

FIG. 1 is a plan view of a rotary drum for explaining an arrangement of a flying-erase head and magnetic heads of the related art;

FIG. 2 is an illustrative drawing showing erasing of prerecorded tracks and recording of a new track in the related art;

FIG. 16 is an illustrative drawing showing tracks recorded on a magnetic tape in the third embodiment;

FIG. 17 is a block diagram of the third embodiment of a VTR device according to the present invention; and FIGS. 18A through 18H are time charts of signals of the VTR shown in FIG. 17.

DESCRIPTION OF THE PREFERRED EMBODIMENTS

In the following, embodiments of the present invention will be described with reference to the accompanying drawings.

Figure 3:
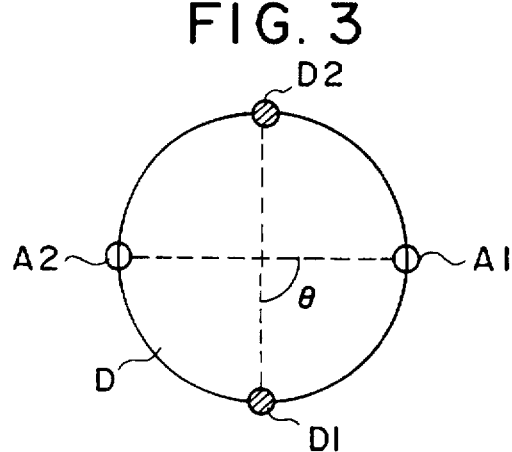
FIG. 3 is a plan view of the rotary drum for explaining an arrangement of magnetic heads provided on the rotary drum according to a first embodiment of the present invention.

FIG. 3 shows a plan view of the rotary drum D for explaining an arrangement of magnetic heads provided on the rotary drum D according to a first embodiment. In FIG. 3, the same elements as those of FIG. 1 are referred to by the same numerals. As shown in FIG. 3, analog-information heads A1 and A2 for recording an analog information signal and digital-information heads D1 and D2 for recording a digital information signal are provided on the rotary drum D. In this manner, one type of a magnetic head records one type of information signal, and another type of a magnetic head records another type of information signal.

In the first embodiment, the analog-information heads A1 and A2 are used as flying-erase heads to erase desired tracks, and the digital-information heads D1 and D2 are used for recording a new information signal. Here, the analog-information heads A1 and A2 have different azimuth angles from each other as do the digital-information heads D1 and D2. For example, the analog-information heads A1 and A2 have azimuth angles of +60° and −60°, respectively, and the digital-information heads D1 and D2 have azimuth angles of +20° and −20°, respectively.

As shown in FIG. 3, the analog-information heads A1 and A2 are provided in such positions that they contact a magnetic tape prior to the digital-information heads D1 and D2, respectively. Here, an angle between the analog-information head A1 and the digital-information head D1 is referred to by θ.

Figure 4:
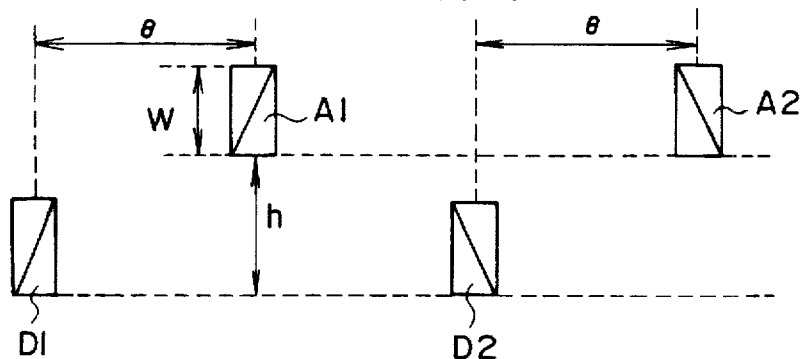
FIG. 4 is an illustrative drawing for explaining an arrangement of the analog-information heads and the digital-information heads of FIG. 3.

FIG. 4 shows an illustrative drawing for explaining an arrangement of the analog-information heads A1 and A2 and the digital-information heads D1 and D2. In FIG. 4, a lateral surface of the rotary drum D is expanded to show the arrangement on a flat plane. In FIG. 4, the vertical direction coincides with the rotational axis of the rotary drum D. As shown in FIG. 4, the analog-information heads A1 and A2, having a width W, are arranged at a higher position than the digital-information heads D1 and D2. The distance between the lower-edge of the analog-information heads A1 and A2 and the lower-edge of the digital-information heads D1 and D2 is indicated by arrow h. Also, head gaps are shown in FIG. 4 by solid lines inside the heads A1, A2, D1, and D2.

Figure 5:
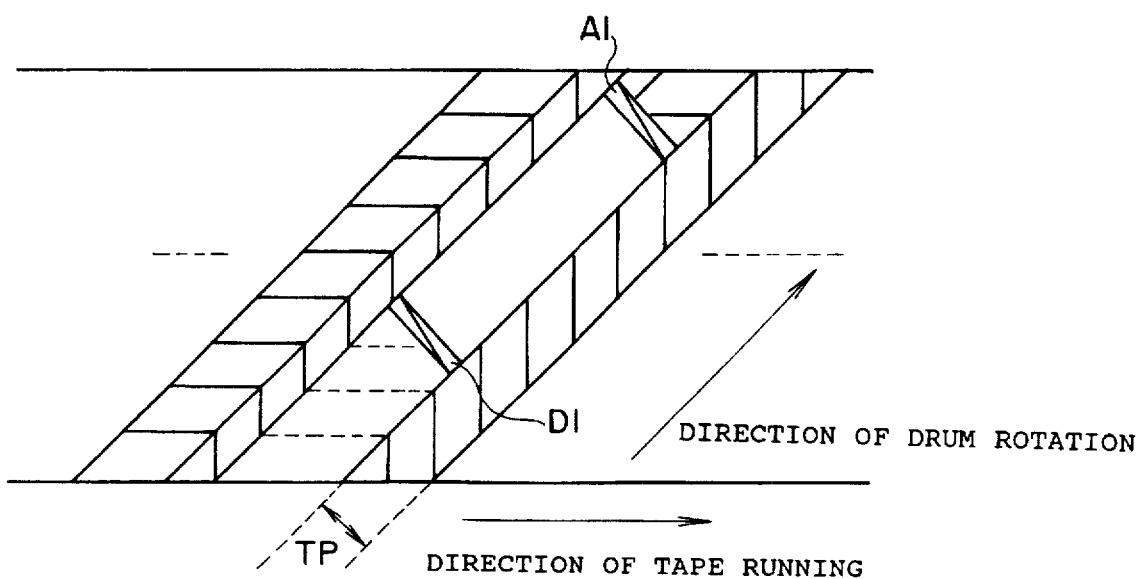
FIG. 5 is an illustrative drawing showing tracks recorded on a magnetic tape in the first embodiment.

FIG. 5 is an illustrative drawing showing tracks recorded on a magnetic tape. With reference to FIG. 5, a description will be given by taking a particular example in which the analog-information heads A1 and A2 erase a digital information signal prerecorded on the magnetic tape and the digital-information heads D1 and D2 record new tracks.

In FIG. 5, tracks shown in horizontal solid lines are those which are formed by the digital-information head D1, whereas tracks shown in vertical solid lines are those which are formed by the digital-information head D2. As shown in FIG. 5, the analog-information head A1 erases a track formed by the digital-information head D1. Then, the digital-information head D1 following the analog-information head A1 forms a new track shown in horizontal dotted lines. Here, a spatial relationship between the analog-information head A2 and the digital-information head D2 is the same as that of the heads A1 and D1. Thus, the operational relation between the analog-information head A2 and the digital-information head D2 is the same as that between the analog-information head A1 and the digital-information head D1.

In the following, conditions which must be met in using the analog-information heads A1 and A2 as flying-erase heads will be described.

As shown in FIG. 5, the trajectory of the lower edge of the analog-information head A1 should coincide with the trajectory of the lower edge of the digital-information head D1. (The lower edge is located downstream with respect to movement of the magnetic tape.) A digital-information head forms one track by shifting relative to the magnetic tape by a track pitch Tp while the rotary drum rotates 180°. Thus, the angle θ and the distance h should meet the following relation.

$$h = Tp \cdot (\theta/180) \qquad (1)$$

Also, in order for the analog-information head A1 to entirely erase a track formed by the digital-information head D1, the head width W of the analog-information head A1 should be wider than the track pitch Tp. Thus, the head width W and the track pitch Tp should satisfy the following relation.

$$W \geq Tp \qquad (2)$$

A configuration satisfying the equation (1) and (2) enables use of the analog-information heads A1 and A2 as flying-erase heads.

Figure 6:
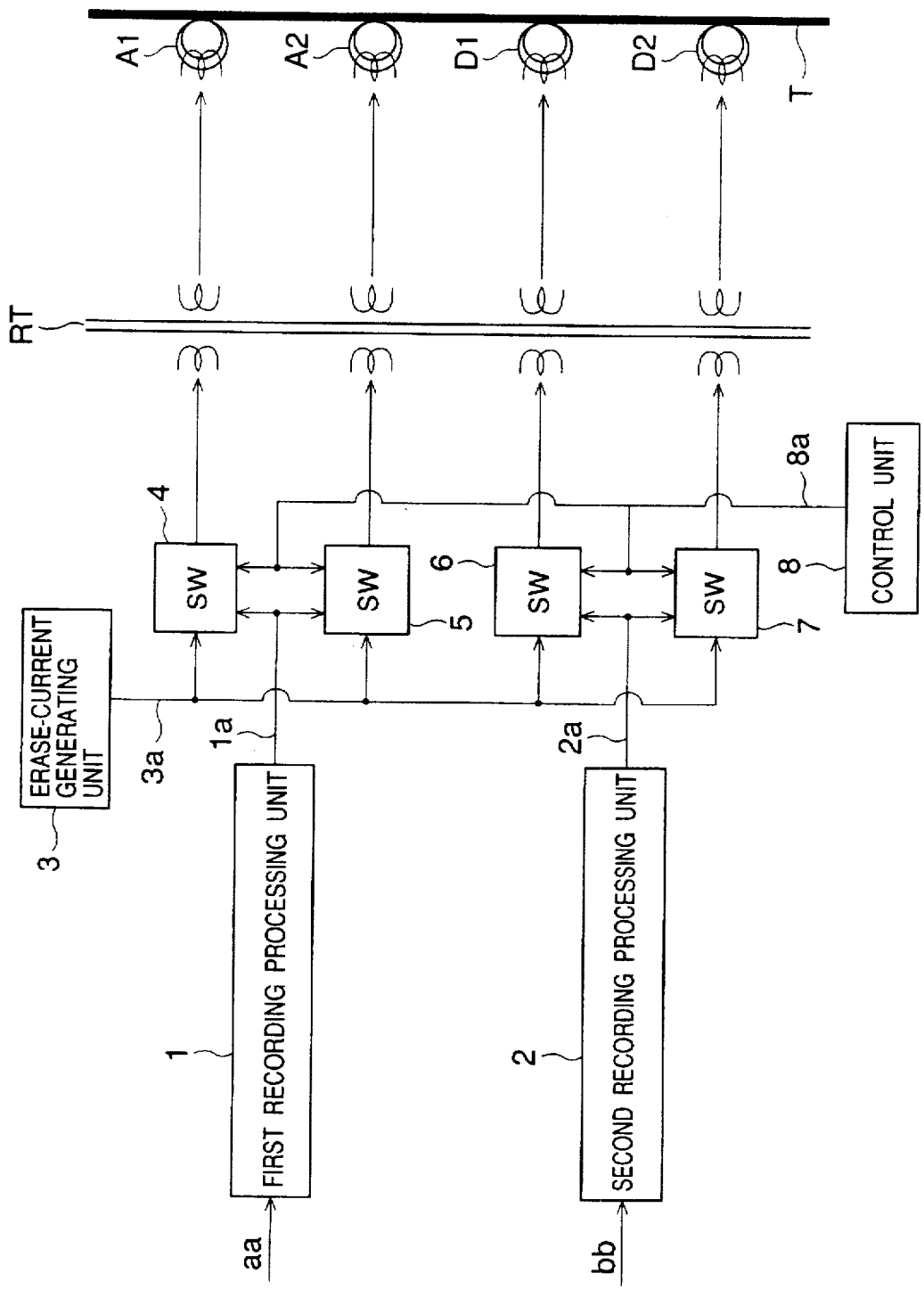
FIG. 6 is a block diagram of the first embodiment of a VTR device according to the present invention.
Figure 7:
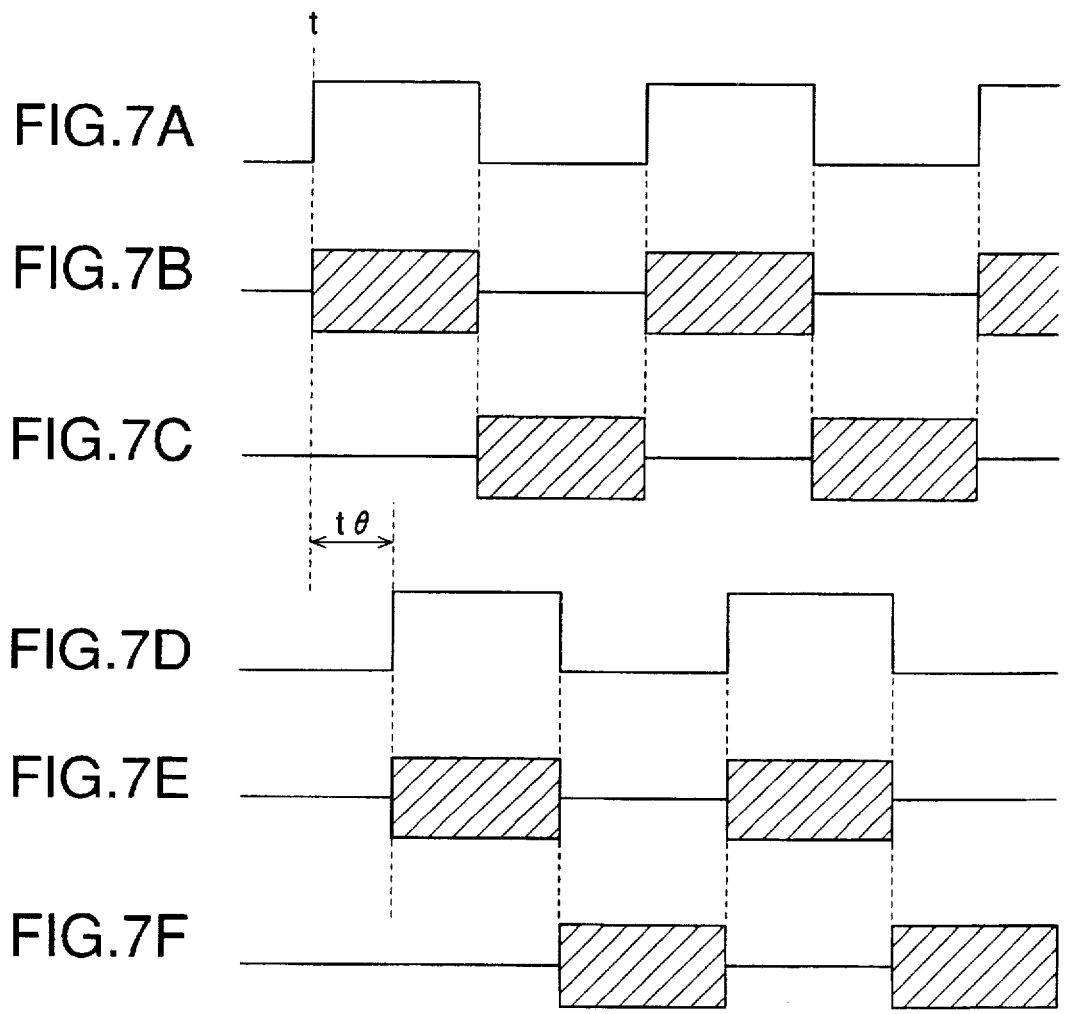
FIGS. 7A through 7F are time charts of signals of the VTR shown in FIG. 6.

FIG. 6 is a block diagram of the first embodiment of a VTR device according to the present invention. With reference to FIG. 6, a VTR having the analog-information heads A1 and A2 and the digital-information heads D1 and D2 will be described.

In FIG. 6, the VTR includes a first recording processing unit 1, a second recording processing unit 2, an erase-current generating unit 3, a first switching unit 4, a second switching unit 5, a third switching unit 6, a fourth switching unit 7, a control unit 8, a rotary transformer RT, the analog-information head A1, the analog-information head A2, the digital-information head D1, and the digital-information head D2.

In FIG. 6, the first recording processing unit 1 receives a first video signal aa having analog information from a transmission line. Also, the second recording processing unit 2 receives a second video signal bb having digital information from a transmission line. The first recording processing unit 1 separates a luminance signal and color signals from the first video signal aa (YC separation). Then, the first recording processing unit 1 applies the pre-emphasis processing on the luminance signal, and frequency modulates a resulting luminance signal to generate a modulated luminance signal. Also, the first recording processing unit 1 applies a PS (phase shift) system or a PI (phase invert) system to the color signal, and, also, converts the color signal into a low-frequency range which is lower than the band of the modulated luminance signal. Then, the first recording processing unit 1 generates a first recording signal 1a by frequency multiplexing the modulated luminance signal and the frequency-converted color signal. The second recording processing unit 2 attaches error-correction codes to the second video signal bb, and modulates a resulting signal through a predetermined modulation scheme such as 24-to-25 modulation to generate a second recording signal 2a.

The first recording signal 1a is supplied to each of the first switching unit 4 and second switching unit 5 at one input node thereof. The second recording signal 2a is supplied to each of the third switching unit 6 and fourth switching unit 7 at one input node thereof. The other input node of each of the switching unit 4 through 7 receives an erase signal 3a from the erase-current generating unit 3. A control signal 8a supplied from the control unit 8 is used for selecting one of the two signals applied to the input nodes of the switching units 4 through 7. Here, the erase signal 3a is set to a higher frequency than a recording frequency of the first and second recording signals 1a and 2a. However, different erase signals 3a may be generated for each of the analog information and the digital information by taking into account differences in erase frequencies and erase-current strength.

Output signals of the switching units 4 through 7 are supplied to the analog-information heads A1 and A2 and the digital-information heads D1 and D2, respectively, via transmission channels of the rotary transformer RT. Each head is used for recording or erasing an information signal on a magnetic tape T.

FIGS. 7A through 7F show time charts of signals of the VTR shown in FIG. 6. With reference to FIGS. 7A through 7F, a description will be given of a case in which the analog-information heads A1 and A2 are used as the flying-erase head and the digital-information heads D1 and D2 are used for recording an information signal.

FIG. 7A shows a signal representing a rotation phase of the analog-information heads A1 and A2. During high-level periods of this signal, the analog-information head A1 is in contact with the magnetic tape T. The analog-information head A2 is in contact with the magnetic tape T during low-level periods of this signal.

At time t, an operation starts for erasing a prerecorded information signal and for recording a new information signal. After the start of the operation, the erase signal 3a selected at the first and second switching units 4 and 5 is supplied to the analog-information heads A1 and A2, respectively. The timing at which the erase signal 3a is supplied to the analog-information heads A1 and A2 is shown by the hatched portions of FIG. 7B and FIG. 7C, respectively. In this manner, desired tracks are erased.

FIG. 7D shows a signal representing a rotation phase of the digital-information heads D1 and D2. During high-level periods of this signal, the digital-information head D1 is in contact with the magnetic tape T. The digital-information head D2 is in contact with the magnetic tape T during low-level periods of this signal. A leading edge of the signal of FIG. 7D is delayed, compared with that of the signal of FIG. 7A, by a rotation period t$\theta$ during which the rotary drum rotates by the angle $\theta$.

The second recording signal 2a selected at the third and fourth switching units 6 and 7 is supplied to the digital-information heads D1 and D2, respectively. The timing at which the second recording signal 2a is supplied to the digital-information heads D1 and D2 is shown by the hatched portions of FIG. 7E and FIG. 7F, respectively. In this manner, a digital information signal is recorded in desired tracks.

In the first embodiment, the analog-information heads A1 and A2 are used as the flying-erase heads described above. It should be noted that the digital-information heads D1 and D2 may be used as the flying-erase heads, in which case the analog-information heads A1 and A2 are used for recording a new information signal. In this case, a positional relation between the analog-information heads A1 and A2 and the digital-information heads D1 and D2 should be changed.

The first embodiment has been described above with a particular example in which each of the analog-information heads A1 and A2 erases a single track. However, each of the analog-information heads A1 and A2 may be used for erasing a plurality of tracks.

The number of tracks simultaneously erased is represented by k. In order for the analog-information head A1 to entirely erase k lines of tracks formed by the digital-information heads D1 and D2, the head width W of the analog-information head A1 should be at least k times as wide as the track pitch Tp. Thus, the equation (2) described above should be revised as follows.

$$W \geq k \cdot Tp \qquad (3)$$

Here, the case in which k is equal to one corresponds to the first embodiment.

Thus, in the case of simultaneously erasing k lines of tracks, satisfying the equations (1) and (3) enables the use of one head type, i.e., the analog-information type or the digital-information type, as the flying-erase head of the other head type.

When k is greater than one, only one of the analog-information heads A1 and A2 may be used for erasing a prerecorded information signal. In this case, the erase signal 3a is supplied to only one of the analog-information heads A1 and A2.

Figure 8:
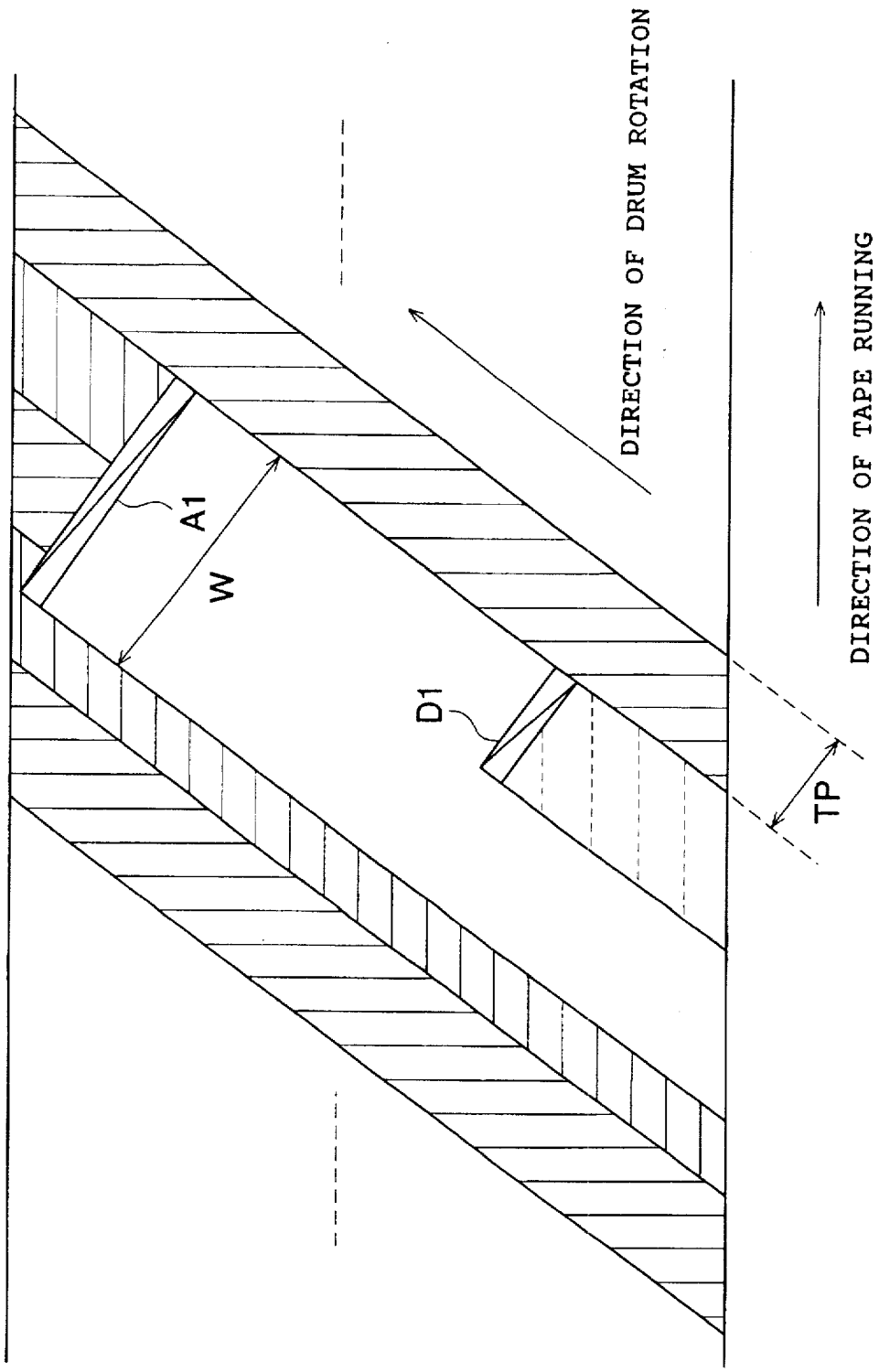
FIG. 8 is an illustrative drawing showing tracks recorded on a magnetic tape in which a plurality of tracks are erased simultaneously.

FIG. 8 is an illustrative drawing showing tracks recorded on a magnetic tape in which a plurality of tracks are erased simultaneously. In this case, for example, the track pitch Tp is set to 19.3 µm and the head width W is set to 46 µm. In the figure, tracks formed by the digital-information heads D1 and D2 are erased by the analog-information head A1, and, then, a new digital information signal is recorded by using the digital-information heads D1 and D2.

As described above, there are two configurations in the first embodiment. In the first configuration, a single track is erased, and the magnetic tape is shifted by the track pitch Tp by the time of next erasing. In the second configuration, k lines of tracks are simultaneously erased, and the magnetic tape is shifted by a distance R ($\leq$ k·Tp) by the time of the next erasing. In the second configuration, erasing can be intermittent.

A second embodiment uses the digital-information heads D1 and D2 for simultaneous recording and the analog-information heads A1 and A2 as the flying-erase heads. The second embodiment will be described below with reference to FIG. 9 through FIG. 13. In FIG. 9 through FIG. 13, the same elements as those of FIG. 3 through FIG. 8 are referred to by the same numerals, and a description thereof will be omitted.

Figure 9:
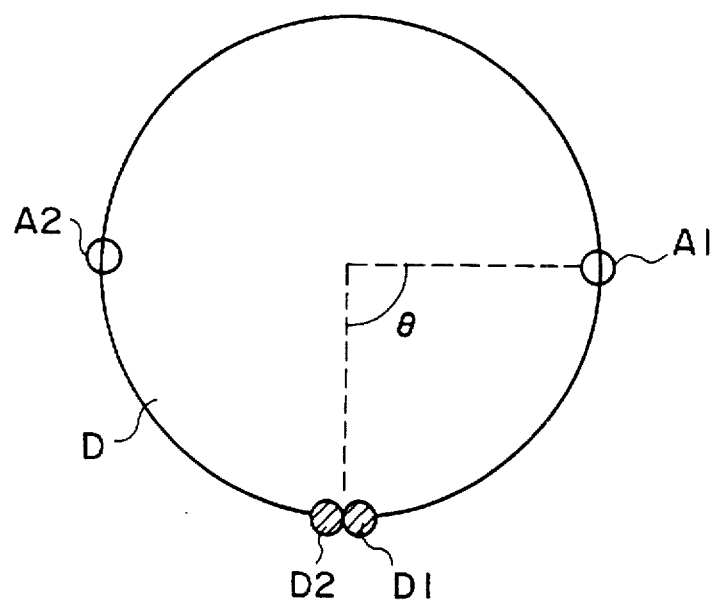
FIG. 9 is a plan view of the rotary drum for explaining an arrangement of magnetic heads provided on the rotary drum according to a second embodiment of the present invention.

FIG. 9 shows a plan view of the rotary drum D for explaining an arrangement of magnetic heads provided on the rotary drum D according to the second embodiment. As shown in FIG. 9, the digital-information head D1 and the digital-information head D2 are arranged in adjoining positions. Also, the analog-information head A1 is arranged at the angle $\theta$ relative to the digital-information heads D1 and D2.

Figure 10:
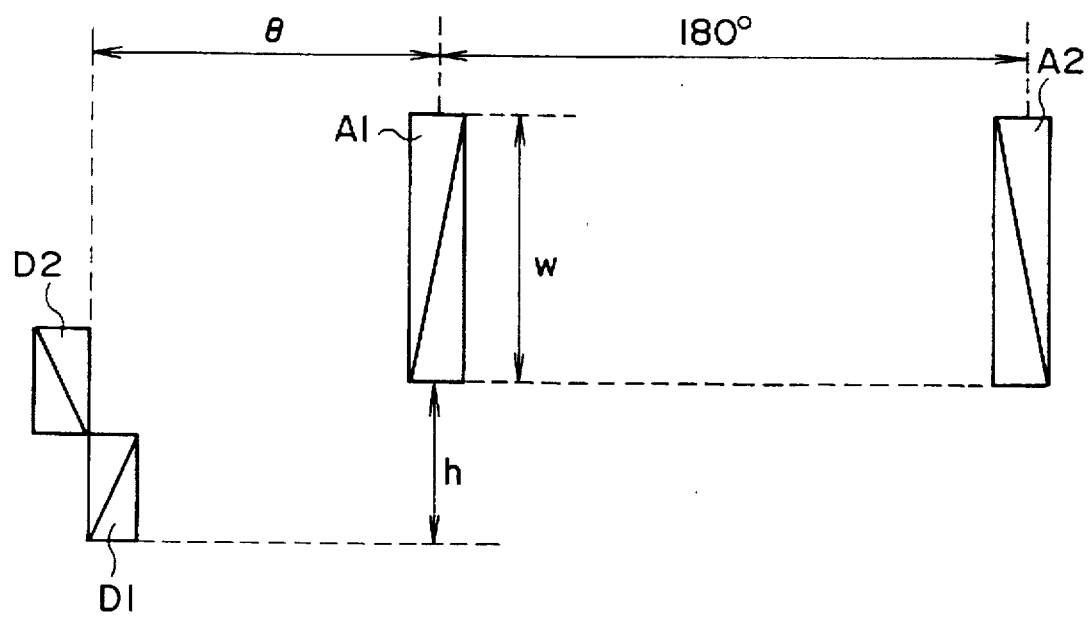
FIG. 10 is an illustrative drawing for explaining an arrangement of the analog-information heads and the digital-information heads of FIG. 9.

FIG. 10 shows an illustrative drawing for explaining an arrangement of the analog-information heads A1 and A2 and the digital-information heads D1 and D2. In FIG. 10, a lateral surface of the rotary drum D is expanded to show the arrangement on a flat plane. Here, vertical direction in FIG. 10 coincides with a rotational axis of the rotary drum D. As shown in FIG. 10, the analog-information heads A1 and A2 having a width W are arranged at a higher position than the digital-information heads D1 and D2. A distance between the lower-edge of the analog-information heads A1 and A2 and the lower-edge of the digital-information head D1 is indicated by the arrow h. As shown in FIG. 10, the digital-information heads D1 and D2 adjoin each other in a diagonal direction.

Figure 11:
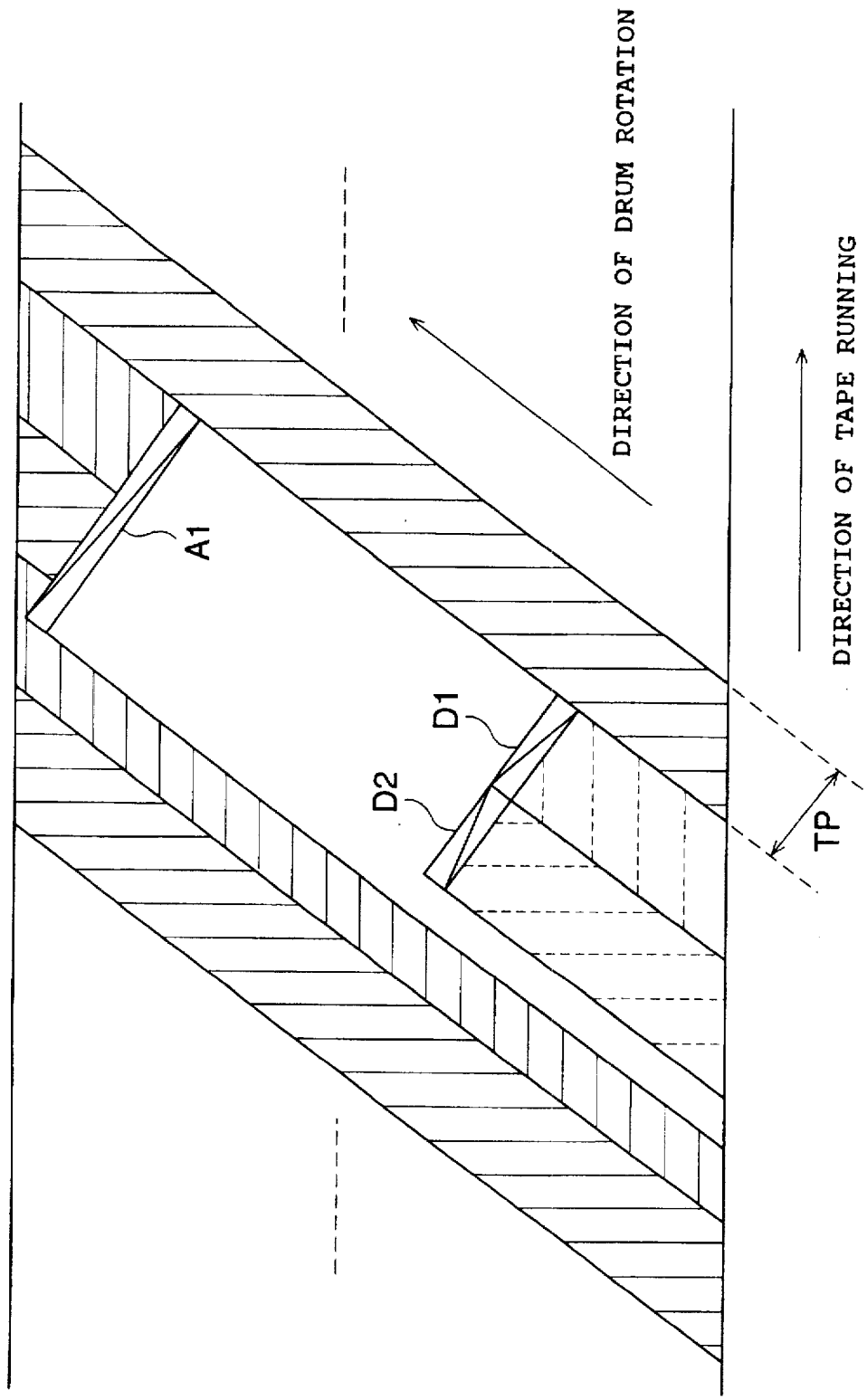
FIG. 11 is an illustrative drawing showing tracks recorded on a magnetic tape in the second embodiment.

FIG. 11 is an illustrative drawing showing tracks recorded on a magnetic tape. With reference to FIG. 11, a description will be given by taking a particular example in which the analog-information head A1 erases a digital information signal prerecorded on the magnetic tape and the digital-information heads D1 and D2 record new tracks.

In FIG. 11, tracks shown in horizontal solid lines are those which are formed by the digital-information head D1, whereas tracks shown in vertical solid lines are those which are formed by the digital-information head D2. As shown in FIG. 11, the analog-information head A1 erases a track formed by the digital-information heads D1 and D2. Then, the digital-information head D1 following the analog-information head A1 forms a new track shown in horizontal dotted lines. At the same time, the digital-information head D2 following the analog-information head A1 forms a new track shown in vertical dotted lines.

In the following, conditions which must be met in using the analog-information head A1 as the flying-erase head will be described.

As shown in FIG. 11, a trajectory of the lower edge of the analog-information head A1 should coincide with a trajectory of the lower edge of the digital-information head D1. Also, a digital-information head is shifted relative to the magnetic tape by twice the track pitch Tp while the rotary drum rotates 360°. Thus, the angle θ and the distance h should meet the following relation.

$$h = 2Tp \cdot (\theta/360) \quad (4)$$
$$= Tp \cdot (\theta/180)$$

Also, in order for the analog-information head A1 to entirely erase two tracks formed by the digital-information heads D1 and D2, the head width W of the analog-information head A1 should be wider than twice the track pitch Tp. Thus, the head width W and the track pitch Tp should satisfy the following relation.

$$W \geq 2Tp \quad (5)$$

A configuration satisfying the equation (4) and (5) enables the use of the analog-information head A1 as the flying-erase head.

Figure 12:
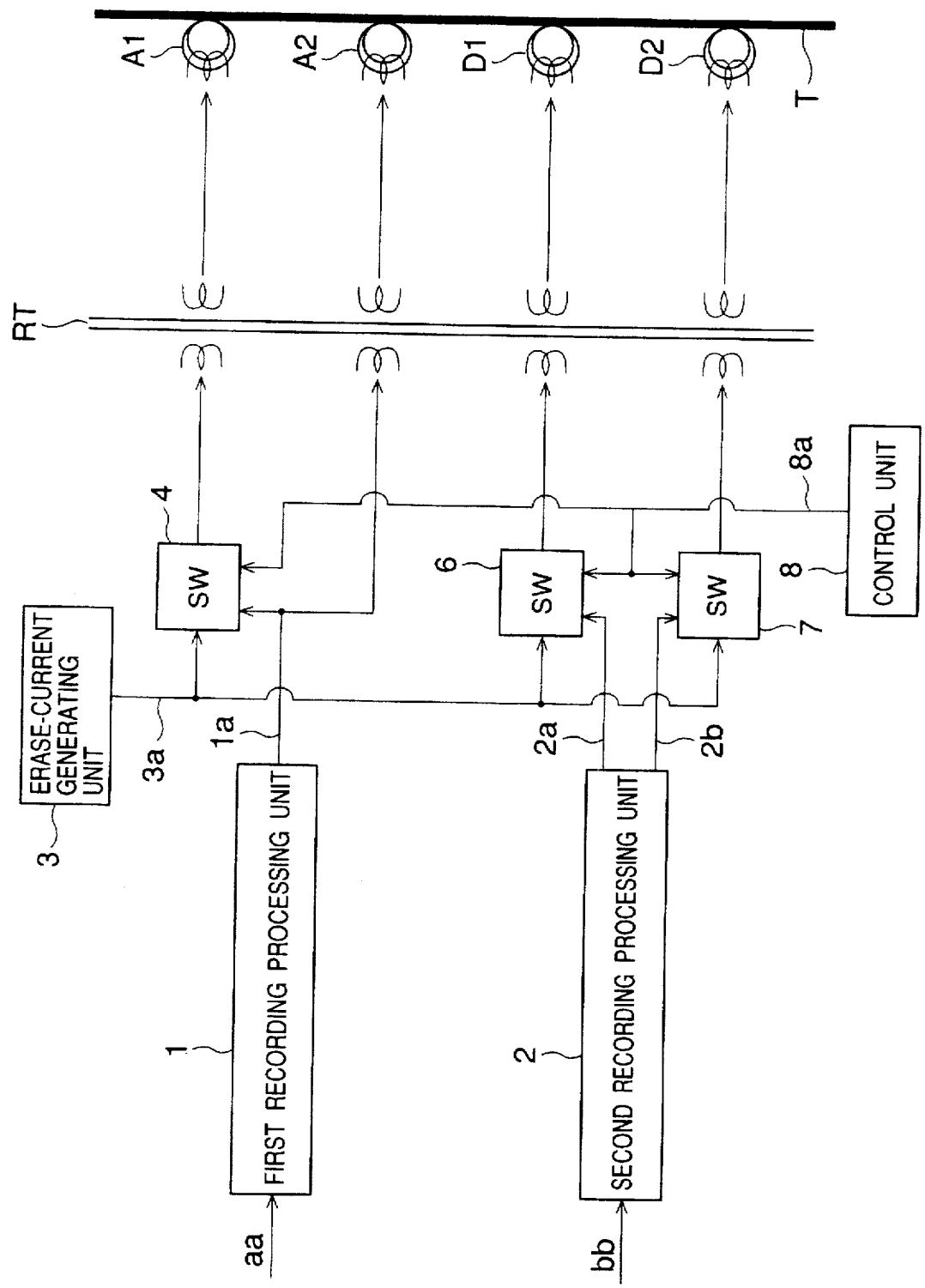
FIG. 12 is a block diagram of the second embodiment of a VTR device according to the present invention.

FIG. 12 is a block diagram of the second embodiment of a VTR device according to the present invention. With reference to FIG. 12, a VTR having the analog-information heads A1 and A2 and the digital-information heads D1 and D2 will be described.

The VTR of FIG. 12 differs from the VTR of FIG. 6 only in the absence of the second switching unit 5 and in the number of outputs of the second recording processing unit 2. In FIG. 12, since the second switching unit 5 is removed, the first recording signal 1a for the analog-information head A2 is directly supplied to the rotary transformer RT. Also, the second recording processing unit 2 generates the second recording signal 2a supplied to the digital-information head D1, and generates a third recording signal 2b supplied to the digital-information head D2. These two signals are provided for the third and fourth switching units 6 and 7.

The reason why the second switching unit 5 is removed is because the analog-information head A2 is not used as the flying-erase head. That is, there is no need for a selection between the first recording signal 1a and the erasing signal 3a with respect to the analog-information head A2. The reason why the second recording processing unit 2 generates the second and third recording signals 2a and 2b is because the digital-information heads D1 and D2 are used for simultaneous recording. That is, there is a need for generating separate recording signals for the digital-information heads D1 and D2.

FIGS. 13A through 13F show time charts of signals of the VTR shown in FIG. 12. With reference to FIGS. 13A through 13F, a description will be given of a case in which the analog-information head A1 is used as the flying-erase head and the digital-information heads D1 and D2 are used for recording an information signal.

Figure 13A:
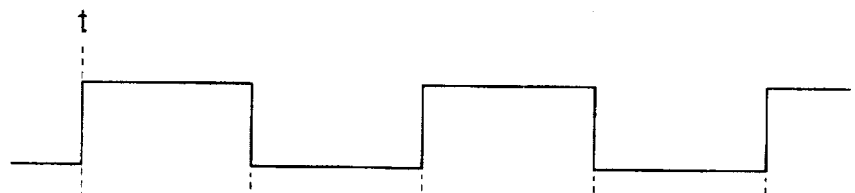
FIGS. 13A through 13F are time charts of signals of the VTR shown in FIG. 12.
Figure 13B:
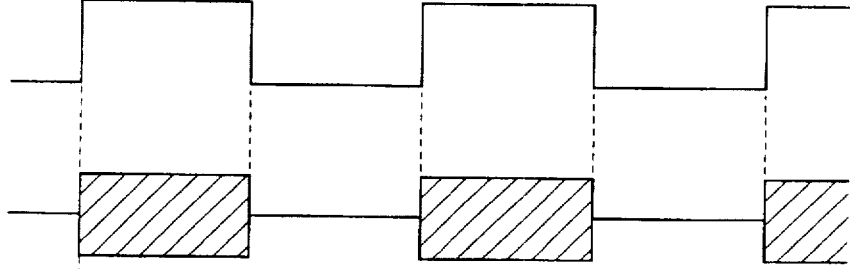
Figure 13C:
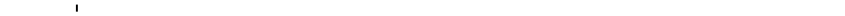
Figure 13D:
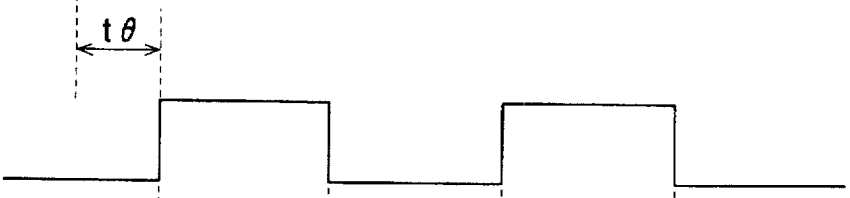
Figure 13E:
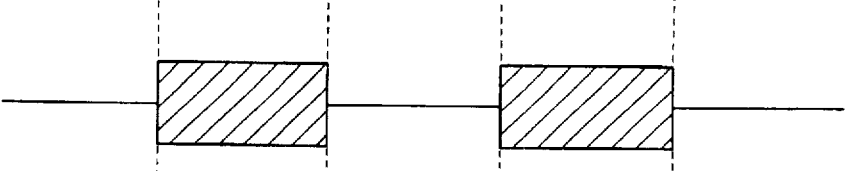
Figure 13F:
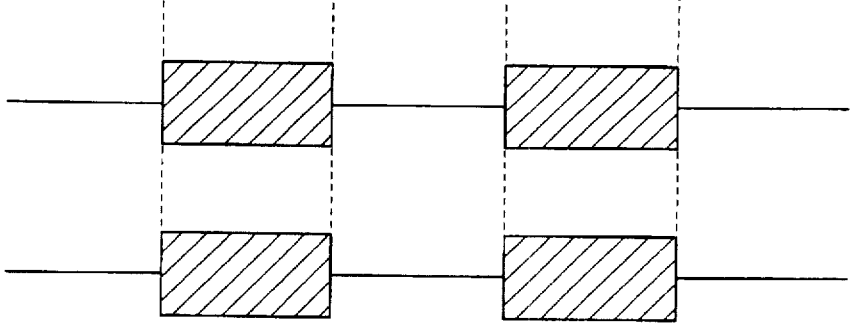

FIG. 13A shows a signal representing a rotational phase of the analog-information heads A1 and A2, and corresponds to FIG. 7A. FIGS. 13B and 13C show time charts of the erase signal 3a supplied to the analog-information heads A1 and A2, respectively. FIGS. 13B and 13C correspond to FIGS. 7B and 7C, respectively. FIG. 13D shows a signal representing a rotational phase of the digital-information heads D1 and D2, and corresponds to FIG. 7D. During high-level periods of this signal, the digital-information heads D1 and D2 are in contact with the magnetic tape T. On the contrary, during low-level periods of this signal, the digital-information heads D1 and D2 are not in contact with the magnetic tape T. FIGS. 13E and 13F show time charts of the second and third recording signal 2a and 2b supplied to the digital-information heads D1 and D2, respectively. FIGS. 13E and 13F correspond to FIGS. 7E and 7F, respectively.

In the second embodiment, the digital-information heads D1 and D2 are used for simultaneous recording, so that the analog-information head A1 erases two tracks at a time. Thus, there is no need to use the analog-information head A2 for erasing a prerecorded information signal. This is why FIG. 13C shows a flat line. Also, since the digital-information heads D1 and D2 are used for simultaneous recording, the third and fourth recording signals 2a and 2b are provided at the same time to the digital-information heads D1 and D2, respectively, as shown in FIGS. 13E and 13F.

Alternately, the analog-information head A2 may be used as the flying-erase head. In this case, the angle θ in the equation (4) must be replaced by "θ+180", which represents an angle between the analog-information head A2 and the digital-information heads D1 and D2.

In the second embodiment, the analog-information head A1 or A2 is used as the flying-erase head as described above. It should be noted that the digital-information heads D1 and D2 may be used as the flying-erase head, so that the analog-information heads A1 and A2 are used for recording a new information signal.

In the following, a first alternative of the second embodiment will be described.

The number of digital-information heads is not limited to two. Digital-information heads D1 through DN (N≧2) can be used for recording N tracks at a time.

Conditions which must be met in using the analog-information head A1 as the flying-erase head will be as follows. A trajectory of the lower edge of the analog-information head A1 should coincide with a trajectory of the lower edge of the digital-information head D1 (arranged at the lowest position). Also, a digital-information head is shifted relative to the magnetic tape by N times the track pitch Tp while the rotary drum rotates 360°. Thus, the angle θ and the distance h should meet the following relation.

$$h = N \cdot Tp \cdot (\theta/360) \quad (6)$$

Also, in order for the analog-information head A1 to entirely erase N tracks formed by the digital-information heads D1 through DN, the head width W of the analog-information head A1 should be at least N times as wide as the track pitch Tp. Thus, the head width W and the track pitch Tp should satisfy the following relation.

$$W \geq N \cdot Tp \qquad (7)$$

In this first alternative, the analog-information head A2, instead of the analog-information head A1, may be used as the flying-erase head.

In the following, a second alternative of the second embodiment will be described.

When the digital-information heads D1 through DN are used for recording N tracks at a time, the analog-information head A2 as well as the analog-information head A1 can be used as the flying-erase heads.

Conditions which must be met in using the analog-information heads A1 and A2 as the flying-erase heads will be as follows.

The angle θ and the distance h should meet the following relation.

$$h = N \cdot Tp \cdot ((\theta + 180)/360) \qquad (8)$$

Also, in order for the analog-information heads A1 and A2 to entirely erase N tracks formed by the digital-information heads D1 through DN, the following conditions must be met. First, areas erased by the analog-information heads A1 and A2 should overlap each other so as not to leave any area unerased. Second, the analog-information heads A1 and A2 must be able to erase areas wider than N times the track pitch Tp. Since the magnetic tape is shifted by N·Tp·(1/2) during a 180° rotation of the rotary drum, head widths W1 and W2 of the analog-information heads A1 and A2, respectively, should satisfy the following relation.

$$W1 \geq N \cdot Tp \cdot (1/2) \qquad (9)$$

$$W2 \geq N \cdot Tp \cdot (1/2) \qquad (10)$$

In the following, a third embodiment of the present invention will be described. In the third embodiment, the analog-information head A1 erases tracks which are simultaneously formed by the digital-information heads D1 and D2, in the same manner as in the second embodiment. In addition, digital-information heads D3 and D4 are provided in the third embodiment, and the analog-information head A2 erases tracks formed by the digital-information heads D3 and D4. Here, the digital-information heads D3 and D4 have different azimuth angles from each other.

FIGS. 14 through FIG. 18 are used for describing the third embodiment. In FIG. 14 through FIG. 18, the same elements as those of FIG. 3 through FIG. 13 are referred to by the same numerals, and a description thereof will be omitted.

Figure 14:
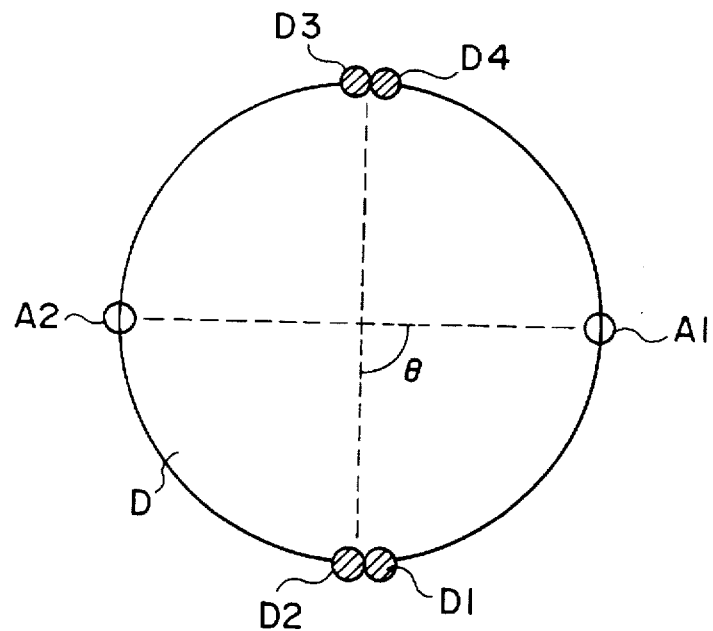
FIG. 14 is a plan view of the rotary drum for explaining an arrangement of magnetic heads provided on the rotary drum according to a third embodiment of the present invention.

FIG. 14 shows a plan view of the rotary drum D for explaining an arrangement of magnetic heads provided on the rotary drum D according to the third embodiment. As shown in FIG. 14, the digital-information head D1 and the digital-information head D2 are arranged in adjoining positions as are the digital-information head D3 and the digital-information head D4. Also, the analog-information heads A1 and A2 are arranged at the angle e relative to the digital-information heads D1 through D4, as shown in FIG. 14.

Figure 15:
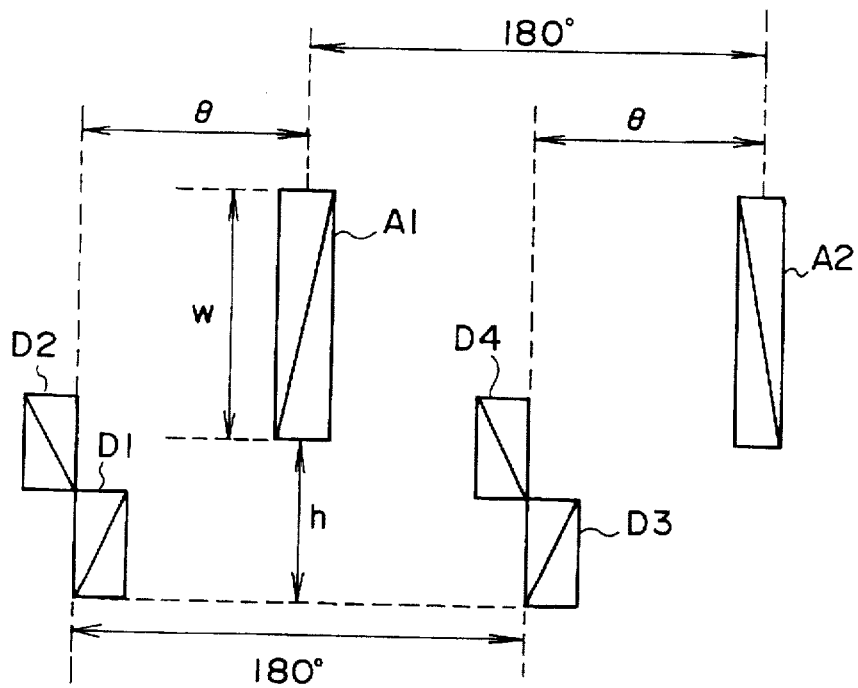
FIG. 15 is an illustrative drawing for explaining an arrangement of the analog-information heads and the digital-information heads of FIG. 14.

FIG. 15 shows an illustrative drawing for explaining an arrangement of the analog-information heads A1 and A2 and the digital-information heads D1 through D4. As shown in FIG. 15, the analog-information heads A1 and A2 having a width W are arranged at a higher position than the digital-information heads D1 through D4. A distance between the lower-edge of the analog-information heads A1 and A2 and the lower-edge of the digital-information heads D1 and D3 is indicated by the arrow h. As shown in FIG. 15, the digital-information heads D1 and D2 adjoin each other in a diagonal direction as do the digital-information head D3 and D4.

FIG. 16 is an illustrative drawing showing tracks recorded on a magnetic tape. With reference to FIG. 16, a description will be given by taking a particular example in which the digital-information heads D1 and D2 record new tracks over areas erased by the analog-information head A1, and in which the digital-information heads D3 and D4 record new tracks over areas erased by the analog-information head A2.

In FIG. 16, tracks shown in horizontal solid lines are those which are formed by the digital-information head D1 or D3, whereas tracks shown in vertical solid lines are those which are formed by the digital-information head D2 or D4. The analog-information head A1 erases tracks formed by the digital-information heads D1 and D2. Then, as shown in FIG. 16, the digital-information head D1 following the analog-information head A1 forms a new track shown in horizontal dotted lines (indicated as (D1)). At the same time, the digital-information head D2 following the analog-information head A1 forms a new track shown in vertical dotted lines (indicated as (D2)). Further, the analog-information head A2 erases tracks formed by the digital-information heads D3 and D4. Then, the digital-information head D3 following the analog-information head A2 forms a new track shown in horizontal dotted lines at the same time as the digital-information head D4 forms a new track shown in vertical dotted lines.

In the following, conditions which must be met in using the analog-information heads A1 and A2 as the flying-erase head will be described.

As shown in FIG. 16, a trajectory of the lower edge of the analog-information head A1 (A2) should coincide with a trajectory of the lower edge of the digital-information head D1 (D3). Also, a digital-information head is shifted relative to the magnetic tape by twice the track pitch Tp while the rotary drum rotates 180°. Thus, the angle e and the distance h should meet the following relation.

$$h = 2Tp \cdot (\theta/180) \qquad (11)$$

Also, in order for the analog-information head A1 (A2) to entirely erase two tracks formed by the digital-information heads D1 and D2 (D3 and D4), the head width W of the analog-information head A1 (A2) should be wider than twice the track pitch Tp. Thus, the head width W and the track pitch Tp should satisfy the following relation.

$$W \geq 2Tp \qquad (12)$$

FIG. 17 is a block diagram of the third embodiment of a VTR device according to the present invention. With reference to FIG. 17, a VTR having the analog-information heads A1 and A2 and the digital-information heads D1 through D4 will be described.

The VTR of FIG. 17 differs from the VTR of FIG. 6 only in a fifth switching unit 9, a sixth switching unit 10, and the number of outputs of the second recording processing unit 2.

In the third embodiment, the digital-information heads D1 and D2 are provided for simultaneous recording as are the digital-information heads D3 and D4. Thus, each of the digital-information heads D1 through D4 should be provided with second through fifth recording signals 2a through 2d, respectively. Also, when used as the flying-erase heads against the analog-information heads A1 and A2, the digital-information heads D1 through D4 should be provided with the erase signal 3a. Thus, the fifth switching unit 9 and the sixth switching unit 10 are provided in addition to the switching units 4 through 7.

FIGS. 18A through 18H show time charts of signals of the VTR shown in FIG. 17. With reference to FIGS. 18A through 18H, a description will be given of a case in which the analog-information heads A1 and A2 are used as the flying-erase heads and the digital-information heads D1 through D4 are used for recording an information signal.

FIG. 18A shows a signal representing a rotational phase of the analog-information heads A1 and A2, and corresponds to FIG. 7A. FIGS. 18B and 18C show time charts of the erase signal 3a supplied to the analog-information heads A1 and A2, respectively. FIGS. 18B and 18C correspond to FIGS. 7B and 7C, respectively. FIG. 18D shows a signal representing a rotational phase of the digital-information heads D1 through D4, and corresponds to FIG. 7D. During high-level periods of this signal, the digital-information heads D1 and D2 are in contact with the magnetic tape T. On the other hand, the digital-information heads D3 and D4 are in contact with the magnetic tape T during low-level periods of this signal. FIGS. 18E and 18F show time charts of the second and third recording signals 2a and 2b supplied to the digital-information heads D1 and D2, respectively. FIGS. 18E and 18F correspond to FIGS. 7E and 7F, respectively. Also, FIGS. 18G and 18H show time charts of the fourth and fifth recording signals 2c and 2d supplied to the digital-information heads D3 and D4, respectively.

In the third embodiment, the digital-information heads D1 and D2 are used for simultaneous recording as are the digital-information heads D3 and D4. Thus, each of the analog-information head A1 and the analog-information head A2 is required to erase two tracks simultaneously. Accordingly, the analog-information head A1 erases two tracks by using the erase signal 3a of FIG. 18B, before the second and third recording signals 2a and 2b, respectively, shown in FIGS. 18E and 18F are recorded. Also, the analog-information head A2 erases two tracks by using the erase signal 3a of FIG. 18C, before the fourth and fifth recording signals 2c and 2d, respectively, shown in FIGS. 18E and 18F are recorded.

In the third embodiment, the analog-information heads A1 and A2 are used as the flying-erase heads as described above. It should be noted that the digital-information heads D1 through D4 may be used as the flying-erase heads, so that the analog-information heads A1 and A2 are used for recording a new information signal.

The above description has been provided by taking an information recording device as a particular example. However, it should be noted that the present invention can be applied to an information recording/reproducing device for recording or reproducing an information signal. In such a case, the analog-information heads A1 and A2 are used for recording or reproducing the first video signal aa and the digital-information heads D1 and D2 are used for recording or reproducing the second video signal bb.

Also, the above description has been provided with a particular example in which the first video signal aa is an analog information signal and the second video signal bb is a digital information signal. However, the present invention is not limited to the use of particular types of recorded information signals. The present invention uses one type of magnetic head as the flying-erase head for another type of magnetic head, wherein these two types of magnetic heads are used for recording different information signals. Thus, the present invention can use any type of information signals such as data used in computers or video and voice information signals whose frequency bands are compressed.

In the present invention described above, one type of at least one magnetic head is used as a flying-erase head for another type of at least one magnetic head. Thus, there is no need to provide a special-purpose flying-erase head or to provide an exclusive transmission channel of the rotary transformer for the flying-erase head.

Also, in the present invention, each of the two types of at least one magnetic head can be used as the flying-erase head for the other.

Further, the present invention is not limited to these embodiments, but various variations and modifications may be made without departing from the scope of the present invention.

What is claimed is:

1. A device for recording an information signal on a magnetic tape by using a helical scan, said device comprising:

a rotary drum:

two first magnetic heads of a first type on said rotary drum which record a first type of said information signal and have different azimuth angles from each other;

two second magnetic heads of a second type on said rotary drum which record a second type of said information signal and have different azimuth angles from each other; and switching units which switch said two first magnetic heads and said two second magnetic heads between a recording of said information signal and an erasing of said information signal, wherein during rotation of said rotary drum, each of said two second magnetic heads records said second type of said information signal by forming a track on said magnetic tape, and one of said two first magnetic heads erases a plurality of tracks at a time so as to erase said second type of said information signal prerecorded on said magnetic tape before said two second magnetic heads record said second type of said information signal on said magnetic tape, and wherein said two first magnetic heads are located at endpoints of a first diameter of a first circular cross section of said rotary drum, said one of said two first magnetic heads has a head width W extending in a direction of a rotational axis of said rotary drum, said two second magnetic heads are located at endpoints of a second diameter of a second circular cross section of said rotary drum, said second diameter being at an angle θ° with said first diameter in a rotational direction of said rotary drum, and downstream edges of said two first magnetic heads are positioned a distance h from downstream edges of said two second magnetic heads in a direction of said rotational axis, wherein said downstream edges are located downstream with respect to travel direction of said magnetic tape, wherein a number of tracks (k2≧2) erased at a time by said one of said two first magnetic heads, said head width W, said angle θ, said distance h, and a track pitch Tp of said tracks are related as:

$h=Tp\cdot(\theta/180)$, and $W \geq k2 \cdot Tp$.

2. A device for recording an information signal on a magnetic tape by using a helical scan, said device comprising:

a rotary drum;

two first magnetic heads of a first type on said rotary drum which record a first type of said information signal and have different azimuth angles from each other;

a first set of second magnetic heads of a second type which includes a number N of said second magnetic heads on said rotary drum and records a second type of said information signal by forming N lines of tracks on said magnetic tape such that adjacent tracks are recorded at different azimuth angles;

a second set of said second magnetic heads which includes a number N of said second magnetic heads on said rotary drum and records a second type of said information signal by forming N lines of tracks on said magnetic tape such that adjacent tracks are recorded at different azimuth angles; and switching units which switch said first magnetic heads and said second magnetic heads between a recording of said information signal and an erasing of said information signal, wherein during rotation of said rotary drum, said two first magnetic heads erase said second type of said information signal prerecorded on said magnetic tape before said second magnetic heads record said second type of said information signal on said magnetic tape, and wherein said two first magnetic heads are located at endpoints of a diameter of a circular cross section of said rotary drum, and have head widths W1 and W2 extending in a direction of a rotational axis of said rotary drum, each of said two first magnetic heads erases at least N lines of said tracks at a time, said first set of said second magnetic heads are located next to one another at an angular position indicated by a first radius which is at an angle $\theta$ with said diameter in said circular cross section, said second set of said second magnetic heads are located next to one another at an angular position indicated by a second radius which is opposite to said first radius, and downstream edges of said two first magnetic heads are positioned a distance h upstream in a direction of said rotational axis from a downstream edge of the most downstream one of said second magnetic heads for each of said first set and said second set of said second magnetic heads, a downstream direction is a direction downstream with respect to travel direction of said magnetic tape, wherein said number N, said head widths W1 and W2, said angle $\theta$, said distance h, and a track pitch Tp of said tracks are related as:

$h = N \cdot Tp \cdot (\theta/180)$, $W1 \geq N \cdot Tp$, and $W2 \geq N \cdot Tp$.

\* \* \* \* \*